US006447174B1

(12) United States Patent
Trezza

(10) Patent No.: US 6,447,174 B1
(45) Date of Patent: Sep. 10, 2002

(54) ACTIVE OPTICAL INTERCONNECT

(75) Inventor: John A. Trezza, Nashua, NH (US)

(73) Assignee: Teraconnect, Incorporated, Nashua, NH (US)

( * ) Notice: Subject to any disclaimer, the term of this patent is extended or adjusted under 35 U.S.C. 154(b) by 0 days.

(21) Appl. No.: 09/713,761

(22) Filed: Nov. 15, 2000

Related U.S. Application Data

(60) Provisional application No. 60/165,561, filed on Nov. 15, 1999.

(51) Int. Cl.[7] .............................. G02B 6/43; G02B 6/42
(52) U.S. Cl. ............................................ 385/89; 385/88
(58) Field of Search ..................................... 385/88, 89

(56) References Cited

U.S. PATENT DOCUMENTS

| | | | |
|---|---|---|---|
| 5,078,515 A | | 1/1992 | Soulard et al. |
| 5,263,108 A | | 11/1993 | Kurokawa et al. |
| 5,420,954 A | | 5/1995 | Swirhun et al. |
| 5,428,704 A | | 6/1995 | Lebby et al. |
| 5,524,679 A | | 6/1996 | Wiener |
| 5,533,158 A | | 7/1996 | Han et al. |
| 5,625,732 A | | 4/1997 | Chun et al. |
| 5,825,949 A | | 10/1998 | Choy et al. |
| 5,892,605 A | | 4/1999 | Stevens |
| 6,318,901 B1 | * | 11/2001 | Heremans et al. ............. 385/53 |

FOREIGN PATENT DOCUMENTS

JP      6-140469      5/1994

OTHER PUBLICATIONS

PCT International Search Report dated May 16, 2001, of International Application NO. PCT/US00/42177 filed Nov. 15, 2000.

M. Ajmone Marsan et al, Modelling Slotted Multi–Channel Ring All–Optical Networks, *IEEE*, 1997, pp. 146–153.

Marco Ajmone Marsan et al, Access Protocols for Photonic WDM Multi–Rings with Tunable Transmitters and Fixed Receivers, *SPIE*, pp. 59–72, vol. 2692, No Date.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

Primary Examiner—John D. Lee
(74) Attorney, Agent, or Firm—Scott J. Asmus; Vernon C. Maine; Maine & Asmus

(57) ABSTRACT

A connector and cable provide a two dimensional array of optical channels for interconnecting electronic circuits using a two-dimensional, integrated circuit array of emitter and/or detector elements affixed to the fiber bundle, an ASIC substrate including drive circuitry electrically connected to the array and adapted to drive emitter elements and/or sense detector elements within the array, fanout circuitry associated with the ASIC substrate and drive circuitry for spatially separating the electrical signal channels, and an electrical connector means connected to the fanout circuitry. Applications include all manner of interconnecting circuit boards or similar components within a single system or between systems.

15 Claims, 4 Drawing Sheets

ACTIVE OPTICAL INTERCONNECT

RELATED APPLICATIONS

The present application claims priority of US Provisional Patent Application Ser. No. 60/165,561 filed Nov. 15, 1999.

BACKGROUND OF THE INVENTION

1. Field of the Invention

The present invention generally relates to opto-electronic interconnects, and particularly to opto-electronic interconnect cables having electrical interfaces at the terminal ends thereof.

2. Statement of the Prior Art

The technology associated with digital communications has evolved extremely rapidly over recent years. Computers and related peripheral equipment, satellite and communication systems are becoming ever more sophisticated and powerful demanding constantly higher rates of data communications. Unfortunately, data transfer remains a gating capability. This issue holds for data transfer within an integrated circuit, from one chip to another, from hybrid circuit to hybrid circuit, from integrated circuit board to another integrated circuit board, and from system to system.

Increasing data transfer rates has been tried in several ways. Some increase in the data transfer rate has been obtained by increasing the speed at which signals are communicated from one part of a system or network to another. The fastest known means is the use of optical or photonic signals because they do not suffer the inductance and capacitance problems that electrical signals have. The other approach used for increasing data transfer rates is to increase the number of data channels being used. Increasing the number of channels can be done spatially by increasing the number of optical fiber cables and their associated electronic interfaces or, in the frequency domain, by increasing the number of different frequency or wavelength channels used on each optical fiber cable, i.e. wavelength division multiplexing. In both of these approaches, and especially in combinations thereof, more information is sent during any given period of time thus increasing communication bandwidth.

Opto-electronic communications have their own associated problems however, such as the optical-electronic interface and the requirements of handling fiber optic cables and connections. Because optical communications run at a much higher data rate than the electrical side of the interface, bottlenecks of data typically occur at the opto-electronic point of conversion. These bottlenecks require special data handling electronics. In addition, the electronic components needed to drive and detect the optical signals, have their own special electrical and form factor requirements, in terms of required power and heat dissipation. Lastly, the costs of such components and their circuit requirements are also significant.

Signal transmission interconnects using optical fiber for data transmission and having opto-electronic conversion means at each end of the fiber are known. Different examples of such interconnects are described in U.S. Pat. Nos. 5,420,954; 5,524,679; 5,561,727; and 5,896,480. Such devices are adapted to mechanically and electrically connect to various types of electrical connectors and have one or more, or even linear arrays of, individual fibers for transferring data optically.

Because of the various industry needs and the factors discussed above, a means for further increasing bandwidth or data transmission rates, which employ fiber optic transmission media in a convenient package, would prove useful and would contribute to advancing the power and efficiency of existing systems.

SUMMARY OF THE INVENTION

In view of the above, it is an object of the present invention to provide a high bandwidth, opto-electronic communications device. It is a further object to provide such a device which increases the number of signal channels available for such devices.

Accordingly, the present invention provides an optoelectronic connector for terminating the end of a fiber optic bundle having a two-dimensional array of separate fiber channels, including; a two-dimensional, integrated circuit array of emitter and/or detector elements affixed to the fiber bundle and adapted to couple photonic signals between the separate fiber channels of the bundle and respective separate emitter or detector elements within the array; an ASIC substrate including drive circuitry electrically connected to the array and adapted to drive emitter elements and/or sense detector elements within the array and adapted to provide a separate electrical signal channel corresponding to each separate emitter and detector element and thereby corresponding to each separate fiber channel; fanout circuit means associated with the ASIC substrate and drive circuitry for spatially separating the electrical signal channels; and an electrical connector means connected to the fanout circuit means and having individual connectors corresponding to the separate electrical signal channels and thereby to the separate fiber channels, with the electrical connector means being adapted to mechanically and electrically connect to a separate electrical connector.

BRIEF DESCRIPTION OF THE DRAWINGS

The present invention is illustratively described in reference to the appended drawings in which:

FIG. 3 is a representational perspective view of an application of the embodiments of FIGS. 1 and 2; and.

DETAILED DESCRIPTION OF THE DRAWINGS

Figure 1:
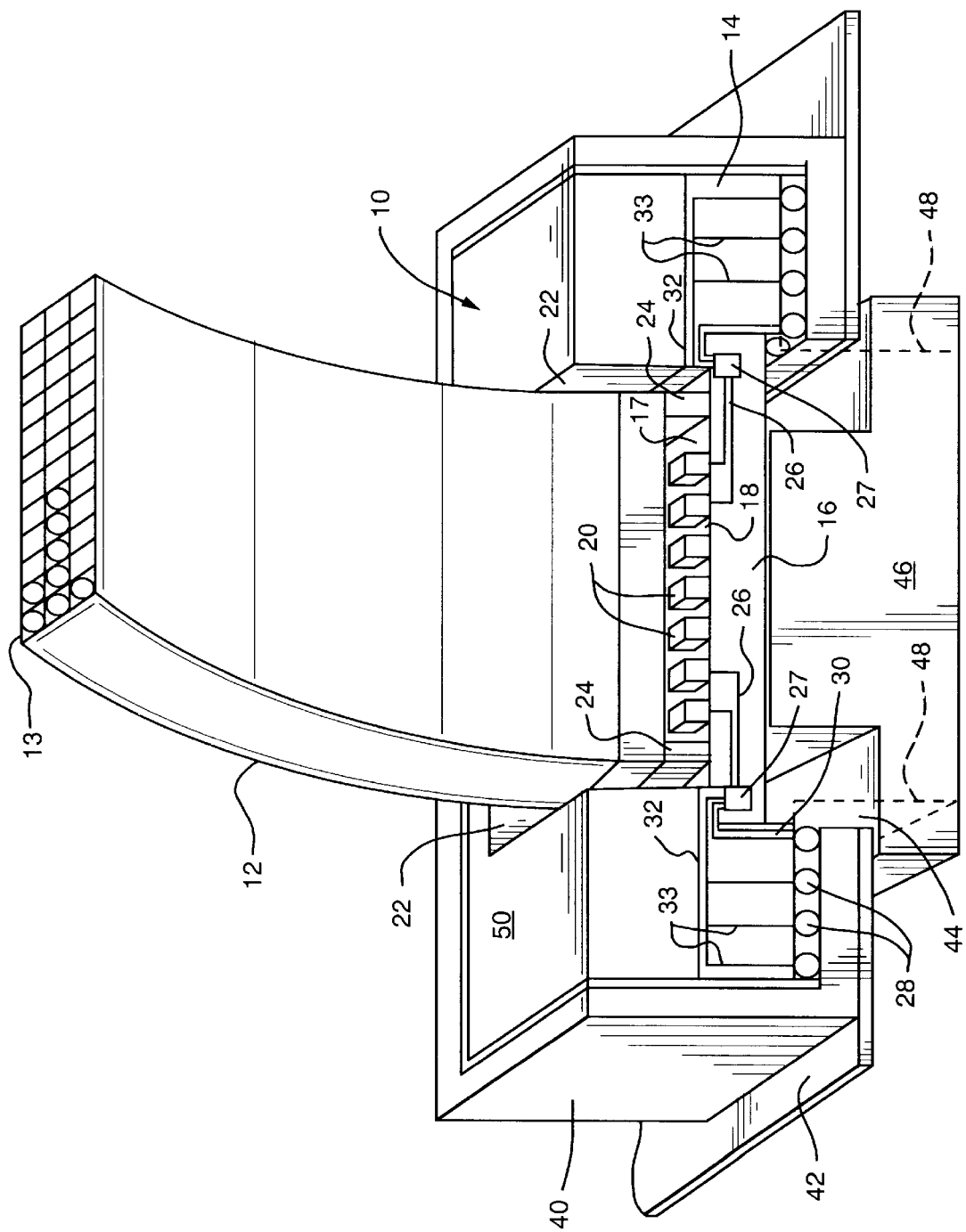
FIG. 1 is a representational, cross-sectional, perspective view of a connector constructed in accordance with one embodiment of the present invention.

FIG. 1 shows an electrical connector 10 affixed to one end of a fiber optic bundle 12. Connector 10 generally includes a peripheral support 14, a centrally located ASIC substrate 16 affixed to peripheral support 14 and a two-dimensional array 18 of opto-electronic conversion elements 20 mounted on ASIC substrate 16. These components are out of proportion in FIG. 1 for the purpose of showing detail. ASIC substrate 16 and array 18 would typically be much smaller in relation to connector 10.

Array 18 can include optoelectronic emitters, such as Vertical Cavity Surface Emitting Lasers or VCSELS, and/or opto-electronic detectors such as photo diodes. Array 18 may include only emitters or only detectors or combinations of both in any suitable arrangement. Separate arrays of emitters and detectors may be mounted on ASIC substrate 16, or the emitters and detectors may be interspersed within the array 18 in any desirable configuration such as alternating linear segments or even alternating individual components. Likewise, the array 18 may be made up of optoelectronic components which act as both emitters and detectors, such as those disclosed in co-owned, copending patent application by John A. Trezza entitled OPTICAL INTERCONNECT USING MULTIFUNCTIONAL OPTICAL ELEMENTS filed Oct. 13, 2000, U.S. application Ser. No. 09/687,042, the contents of which are hereby incorporated by reference herein.

Fiber optic bundle 12 is constructed as a two-dimensional array 13 of optical fibers, which array is generally complementary to the array 18 of emitters and/or detectors. The individual fibers of bundle 12 are representationally shown in the end section 22 of bundle 12. The bundle 12 may be any suitable fiber optic bundle such as currently available, ordered fiber arrays or coherent fiber bundles. In an ordered fiber array, each individual fiber of the bundle represents a single optical channel for photonic signals. In a coherent fiber bundle, each optical channel is typically represented by more than one individual fiber.

Fiber bundle 12 is affixed to connector 10 within a central opening 22 of connector 10 by means of epoxy. The upper surface of ASIC substrate 16 includes a standoff 24, or peripheral ridge of epoxy, constructed around the array 18 and the drive circuitry of substrate 16, which standoff helps to position the bundle 12 with respect to array 18 and particularly acts as a standoff to protect array 18 from contact with the bundle 12. The peripheral nature of the epoxy standoff 24 also helps to protect the sensitive light interface between array 18 and fiber bundle 12 from contamination. Once the fiber bundle 12 is properly aligned with array 18, it may be held in place while epoxy is injected into the remaining portions of central opening 22 and allowed to cure.

ASIC substrate 16 is typically made of silicon having a pair of opposing planar surfaces. Drive circuitry is constructed on the top surface 17 of the silicon substrate 16 and the array of emitters and/or detectors are electrically bonded on top of the drive circuitry by means of flip-chip bump bonding. This construction is described in much greater detail in the co-owned, copending patent application by John A. Trezza entitled METHOD FOR INTEGRATION OF INTEGRATED CIRCUIT DEVICES, filed on Sep. 1, 2000, U.S. application Ser. No. 09/653,369, the contents of which are hereby incorporated by reference herein. The drive circuitry is typically much thinner than the underlying substrate and may include a wide variety of passive and active electronic components depending upon the needs of the emitter and/or detector array 18.

In the embodiment of FIG. 1, ASIC substrate 16 also includes fanout means 26 in the form of individual electrical conductors formed with the drive circuitry either on or in proximity to the top surface of the substrate 16. The fanout means 26, or conductors are shown disproportionately large for purposes of detail. In addition, fewer than all of the conductors that would be used are shown. Fanout means 26 forms electrical channels which carry signals from individual array elements 20 and their associated drive circuitry to the periphery of the ASIC substrate 16. At this point, it is possible to construct much larger contact pads 27 for the individual conductors than would be possible within the confines of the densely packed array 18. Because of this, the individual contact pads 27 may be more easily mated with conductors of the connector 10. Connector 10 includes individual conductors which maintain the individual electrical channels from the fanout means 26 and connect them to individual connector contacts 28. Two such individual conductors 30 are shown while a pair of buses 32 having individual conductors 33 represent additional conductors. The individual contacts 28 are depicted as a ball grid, however any suitable contacts may be used.

Connector 10 is nominally shown coupled to a complementary connector 40 affixed to a printed wiring board (PWB) 42. Both the mating connector 40 and PWB 42 show a centrally located opening 44 corresponding to the location of the bottom surface of ASIC substrate 16. Also shown is a heat sink 46 which extends through the central opening 44 making contact with the bottom surface of substrate 16. In this embodiment, heat sink 46 is shown attached to the PWB 42 around the periphery of opening 44 and abutting the bottom surface of substrate 16. Heat sink 46 may alternatively be constructed as shown by dotted lines 48 to be affixed to connector 10 and/or substrate 16 instead, and to merely clear the opening 44. Yet another heat sink arrangement might have a portion of the heat sink affixed to the bottom surface of substrate 16 and another portion mounted to the PWB 42 and adapted to make contact with the first portion upon mating of connector 10. In either manner, heat generated by the drive circuitry on substrate 16 may easily be dissipated. The heat dissipating structure of heat sink 46 may be determined in accordance with principals known in the art.

Alternatively to the heat sink 46 of FIG. 1, heat from the substrate 16 may be conducted onto the connector 10 and into the upper portions 50 thereof to allow dissipation through any suitable elements such as cooling fins. In view of the typically thin nature of substrate 16, it may be constructed unusually thick or additionally bonded to a thicker substrate to provide sufficient support in relation to the connector 10. Because of the heat dissipation issues of the substrate 16, it is important that any additional substrate be bonded in a manner which provides for heat transfer and which is not adversely affected by thermal expansion of substrate 16.

Figure 2:
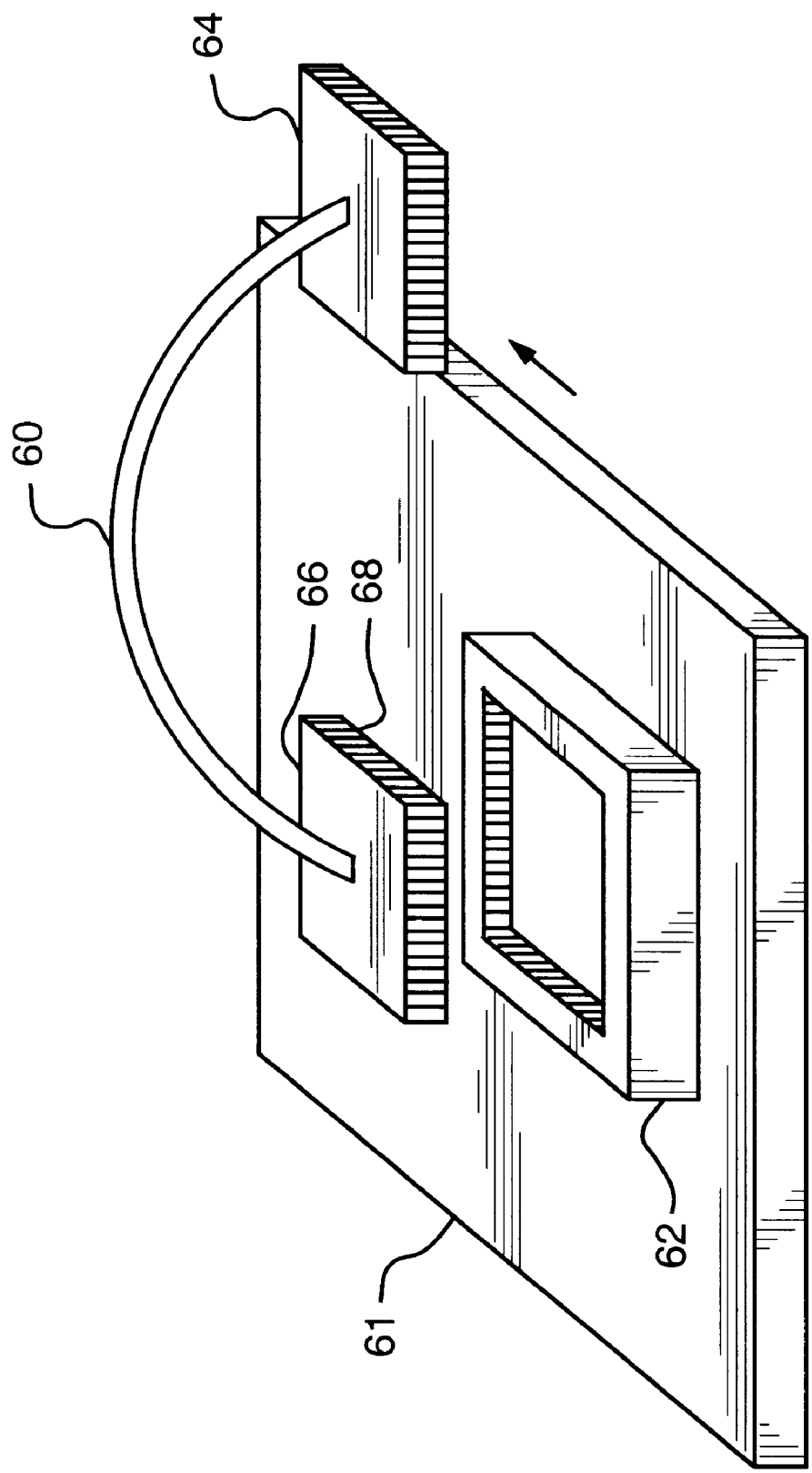
FIG. 2 is a representational perspective view of a connector constructed in accordance with another embodiment of the present invention.

FIG. 2 depicts how a communications cable 60 constructed in accordance with the present invention might be used to connect to a printed circuit board 61 in a system. A complementary connector 62 is mounted on to printed wiring board 61 at an accessible location- The other end 64 of cable 60 would be used to interconnect to another similar board. The connector 66 might also take on a slightly different form from the connector 10 as it may be created by a wireless chip carrier. Such wireless chip carriers are known in the industry and used to house an integrated circuit chip for easier circuit insertion and removal. Instead of holding a typical integrated circuit, such a carrier would contain a suitable ASIC 16, array 18 and means for attaching a fiber optic bundle 12. Connector 66 would have a multiplicity of electrical contacts 68 formed around the sides thereof, which contacts would connect to corresponding contacts on the connector 62. In this mnanner, disconnection of the cable would be performed in the same manner as removal of a chip carrier.

Figure 3:
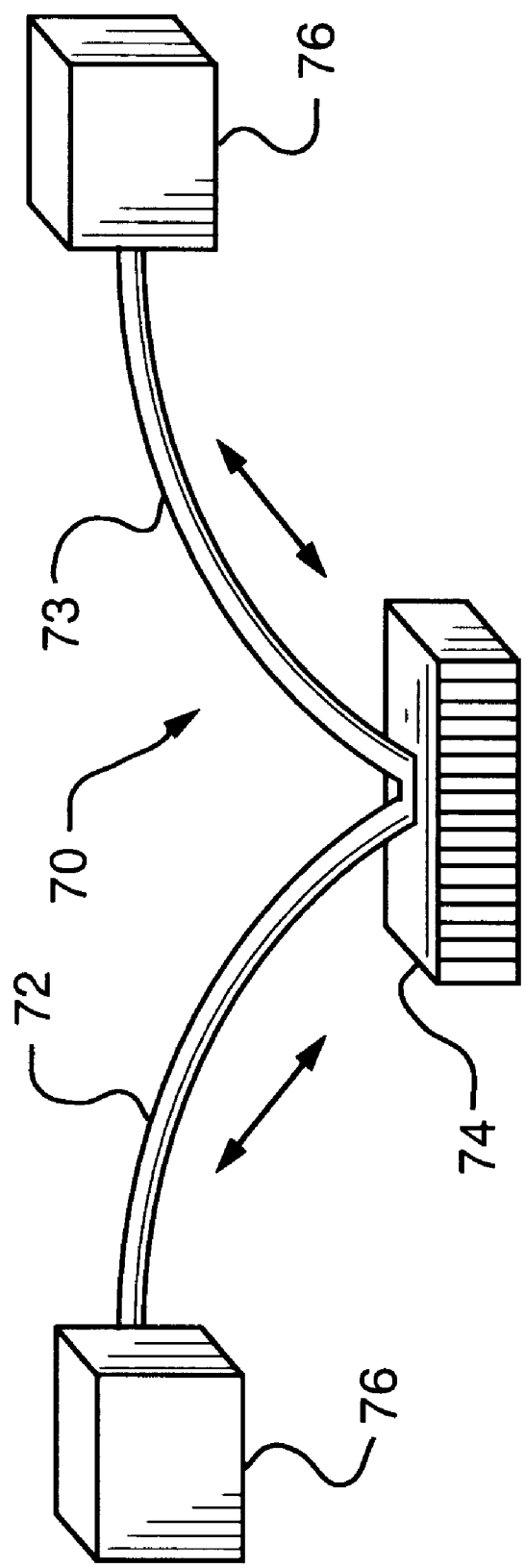

In addition to point-to-point communications, the present invention may be used to form the nodal points of a ring network such as that described in co-owned, copending patent application entitled METHOD FOR IMPLEMENTING A NETWORK HAVING A RECEIVER RESERVED CHANNEL filed on Sep. 1, 2000 by Timothy P. Boggess and John A. Trezza, U.S. application Ser. No. 09/653,727, the contents of which are hereby incorporated by reference herein. To accomplish this, the fiber bundle 70 as shown in FIG. 3 may include a pair of fiber bundles 72, 73, the ends of which are affixed together prior to their insertion into and affixing to the connector 74. In this manner, the separate fiber bundles would extend to adjacent network nodes and data would be paused through the ring network by being coupled from detectors receiving signals from one bundle 72 to emitters transmitting signals into the adjacent bundle 73. These detectors and emitters would be mounted to adjacent portions of the same ASIC substrate 16 and the signals would be passed through the ASIC ciruitry.

Figure 4:
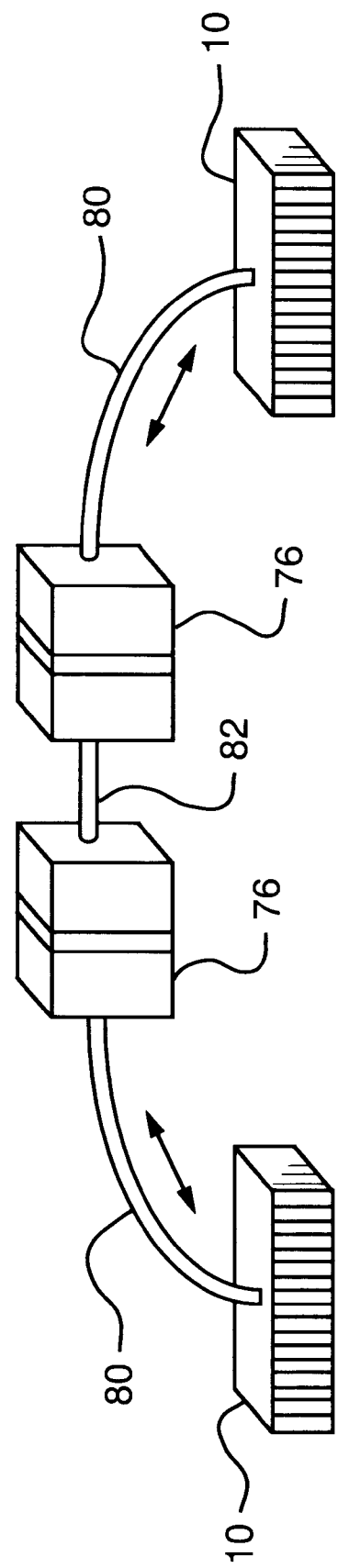
FIG. 4 is a representational perspective view of another application of the embodiments of FIGS. 1 and 2.

Applications may also arise where greater flexibility is needed in the interconnects, for example by easily being able to vary the length of an interconnect at the point of installation. In such cases it may be useful to provide the fiber optic bundle with purely fiber-to-fiber connectors so that variable length extensions may be used to meet any particular installation requirement. This feature is shown in FIGS. 3 and 4, in the form of optical connectors 76, which are used to terminate the fiber bundles 72,73. Alternatively to terminating both ends of a fiber cable 60 with similar electro-optical connectors, such as 10, 64 & 66 shown in FIGS. 1 and 2, one end of a cable 80 is terminated by a non-converting, optical connector 76, while the other end is terminated with an electro-optical connector 10. In this manner, the cable 80 may be connected to other fiber bundles through that optical connector 76. Thus, more than one cable 80 may be directly interconnected through optical connectors 76, or they may be interconnected as shown through a fiber cable extension 82, which has a fiber connector 76 at each end thereof.

The embodiments and applications of FIGS. 1–4 offer a convenient solution for interconnecting circuit boards and similar apparatus using optical transmission media, because the optoelectronic interface need not be directly installed on the circuit board or other apparatus. In one embodiment, the optical media is never exposed to a contaminating atmosphere, and concerns about proper handling of the interconnects can be minimized.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. A fiber optic communications cable for interconnecting electrical signals to at least one electrical socket, comprising:
    a fiber optic bundle with a first terminal end and a second terminal end having a two-dimensional array of separate fiber channels;
    a first two-dimensional integrated circuit array of emitter and/or detector elements aligned and attached to said first terminal end of said fiber bundle and adapted to couple photonic signals between the fiber channels of the fiber bundle and said emitter and/or detector elements of said first array;
    an ASIC substrate, wherein said ASIC substrate has drive circuitry electrically connecting to each of said emitter and/or detector elements of said first array and adapted to drive an emitter element and/or sense a detector element and further providing a plurality of separate electrical signal channels corresponding to each said emitter element and each said detector element;
    a fanout circuit for spatially separating said separate electrical signal channels; and
    an electrical connector connected to the fanout circuit and having individual connectors corresponding to said separate electrical signal channels with the electrical connector mechanically and electrically connecting to said electrical socket.

2. The fiber optic communications cable of claim 1, wherein said second terminal end is coupled to one or more optical connectors for coupling said fiber channels to one or more mating optical connectors.

3. The fiber optic communications cable of claim 1, wherein said emitters and/or detectors are electrically connected to said drive circuitry by flip-chip bump bonding.

4. The fiber optic communications cable of claim 1, further comprising a heat sink mechanically coupled to said ASIC substrate and adapted to dissipate heat therefrom.

5. The fiber optic communications cable of claim 1, wherein said first two-dimensional integrated circuit array contains both emitter and detector elements enabling two way signal communications over said cable.

6. The fiber optic communications cable of claim 1, wherein the fanout circuit is integrated in said ASIC substrate.

7. The fiber optic communications cable of claim 1, wherein said ASIC substrate has opposing, substantially planar surfaces, with a first surface being electrically connected to said first array and said fanout circuit formed in close proximity to said first surface.

8. The fiber optic communications cable of claim 1, wherein said fiber optic bundle is an ordered fiber bundle with each of said separate fiber channels defined by a single optical fiber.

9. The fiber optic communications cable of claim 1, wherein said fiber optic bundle is a coherent fiber bundle with each of said separate fiber channels defined by multiple optical fibers.

10. A fiber optic communications cable for interconnecting electrical signals between two or more electrical sockets, comprising:
    a fiber optic bundle with a first terminal end and a second terminal end and having a two-dimensional array of separate fiber channels;
    a first two-dimensional integrated circuit array of emitter and/or detector elements aligned and attached to said first terminal end of said fiber bundle and adapted to couple photonic signals between the fiber channels of the fiber bundle and said emitter and/or detector elements of said first array;
    a first ASIC substrate, wherein said first ASIC substrate has drive circuitry electrically connecting to each of said emitter and/or detector elements of said first array and adapted to drive an emitter element and/or sense a detector element and further providing a plurality of separate electrical signal channels corresponding to each said emitter element and each said detector element;
    a first fanout circuit for spatially separating said separate electrical signal channels of said first ASIC substrate,
    a first electrical connector connected to the first fanout circuit and having individual connectors corresponding to said separate electrical signal channels with the first electrical connector mechanically and electrically connecting to one of said electrical sockets;
    a second two-dimensional integrated circuit array of emitter and/or detector elements aligned and attached to said second terminal end of said fiber bundle and adapted to couple photonic signals between the fiber channels of the fiber bundle and said emitter and/or detector elements of said second array;

a second ASIC substrate, wherein said second ASIC substrate has drive circuitry electrically connecting to each of said emitter and/or detector elements of said second array and adapted to drive an emitter element and/or sense a detector element and further providing a plurality of separate electrical signal channels corresponding to each said emitter element and each Said detector element;

a second fanout circuit for spatially separating said separate electrical signal channels of said second ASIC substrate;

a second electrical connector connected to said second fanout circuit and having individual connectors corresponding to said separate electrical signal channels of said second ASIC substrate with the second electrical connector mechanically and electrically connecting to one of said electrical sockets.

11. The fiber optic communications cable of claim 10, further comprising a heat sink mechanically coupled to said first and second ASIC substrate and adapted to dissipate heat therefrom.

12. The fiber optic communications cable of claim 10, wherein said first and second fanout circuit are integrated in said respective first and second ASIC substrate.

13. The fiber optic communications cable of claim 10, wherein said fiber optic bundle is an ordered fiber bundle with each of said separate fiber channels defined by a single optical fiber.

14. The fiber optic communications cable of claim 10, wherein said fiber optic bundle is a coherent fiber bundle with each of said separate fiber channels defined by multiple optical fibers.

15. The fiber optic communications cable of claim 10, wherein said electrical sockets engage chip carriers and said first terminal end and said second terminal end are chip carriers.

* * * * *